United States Patent
Jeon et al.

(10) Patent No.: US 9,562,173 B2
(45) Date of Patent: Feb. 7, 2017

(54) PREPARATION METHOD FOR POROUS PRESSURE SENSITIVE ADHESIVE ARTICLE

(71) Applicant: LG CHEM, LTD., Seoul (KR)

(72) Inventors: Jong Rok Jeon, Daejeon (KR); Se Woo Yang, Daejeon (KR); Suk Ky Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 156 days.

(21) Appl. No.: 13/893,933

(22) Filed: Aug. 16, 2013

(65) Prior Publication Data

US 2014/0037936 A1 Feb. 6, 2014

(30) Foreign Application Priority Data

May 14, 2013 (KR) .................. 10-2013-0054348

(51) Int. Cl.
| | |
|---|---|
| *B24D 11/02* | (2006.01) |
| *C09J 7/02* | (2006.01) |
| *B24B 37/22* | (2012.01) |
| *C09J 11/08* | (2006.01) |

(52) U.S. Cl.
CPC ............ *C09J 7/0207* (2013.01); *B24B 37/22* (2013.01); *B24D 11/02* (2013.01); *C09J 7/0217* (2013.01); *C09J 11/08* (2013.01); *Y10T 428/249983* (2015.04)

(58) Field of Classification Search
CPC ................. B24D 11/02; B24B 37/22
USPC ....................................... 427/208.8
See application file for complete search history.

(56) References Cited

U.S. PATENT DOCUMENTS

| | | | |
|---|---|---|---|
| 6,503,620 B1* | 1/2003 | Xie et al. ............... | 428/354 |
| 2003/0017331 A1* | 1/2003 | Okochi ............. | C08G 18/3284 |
| | | | 428/343 |
| 2005/0217789 A1* | 10/2005 | Eckstein et al. ......... | 156/244.11 |
| 2008/0233405 A1* | 9/2008 | Dronzek, Jr. ................ | 428/426 |

FOREIGN PATENT DOCUMENTS

| | | |
|---|---|---|
| JP | 08-174405 A | 7/1996 |
| JP | 2006-265410 A | 10/2006 |
| JP | 2007-203400 A | 8/2007 |
| KR | 10-2011-0098689 A | 9/2011 |

* cited by examiner

*Primary Examiner* — Xiao Zhao
(74) *Attorney, Agent, or Firm* — Dentons US LLP

(57) ABSTRACT

There is provided a preparation method for a porous pressure sensitive adhesive article, a porous pressure sensitive adhesive article, and an abrasive pad. According to an example of the present application, as a porous pressure sensitive adhesive article including a pressure sensitive adhesive layer formed on a porous article, an article having excellent resistance to an external shear strength and to peeling can be provided. Further, according to the above method, the porous article can be attached firmly to a large-area adherent. In an example, the porous article may be an abrasive pad.

9 Claims, 2 Drawing Sheets

PREPARATION METHOD FOR POROUS PRESSURE SENSITIVE ADHESIVE ARTICLE

This application is a Utility Application which claims priority to and the benefit of Korean Patent Application Nos. 10-2012-0050924 filed on May 14, 2012 and Korean Patent Application No. 10-2013-0054348 filed on May 14, 2013, which are hereby incorporated by reference in their entirety herein.

TECHNICAL FIELD

The present application relates to a preparation method for a porous pressure sensitive adhesive article, a porous pressure sensitive adhesive article, and an abrasive pad.

BACKGROUND ART

A porous material having pores has been used in various fields for increasing a surface area of an article, buffering a pressure to be applied to an article, adjusting fluidity during friction, or the like. For example, the porous material may include an abrasive pad used for planarization of a semiconductor wafer or display glass, a carbon electrode manufactured by using a binder and a foaming agent, a polymer film or sheet used for improving an absorbent property or wrinkle resistance, or the like.

In most cases, a surface of the porous material includes pores or is not flat. Therefore, it is not easy to form a layer of an adhesive or pressure sensitive adhesive on the surface of the porous material so as to be attached to other objects. This is because the porous surface or the non-flat surface causes a great decrease in wettability of a polymer which is a material of an adhesive or pressure sensitive adhesive.

It is possible to increase wettability of the adhesive or pressure sensitive adhesive with respect to the surface of the porous material by adjusting properties of the polymer. However, along with the increase in wettability, cohesiveness of the adhesive is decreased, and thus, even if a weak shear strength is applied thereto, the adhesive or pressure sensitive adhesive is easily separated from an adhered surface.

Therefore, it is not easy to firmly attach the porous material to an adhered surface, especially when an area of an adherent is increased.

DISCLOSURE

Technical Problem

The present application provides a preparation method for a porous pressure sensitive adhesive article, a porous pressure sensitive adhesive article, and an abrasive pad.

Technical Solution

The present application relates to a preparation method for a porous pressure sensitive adhesive article. In the present specification, the term "porous pressure sensitive adhesive article" may mean a porous article on which a layer of an adhesive is formed directly or via another component so as to be attached to other adherents. The term "porous article" may include all kinds of articles including a surface having at least a pore. In an example, the porous article may be an article including pores having an average size of several tens of nanometers to several millimeters. In the porous article, the pores formed on the surface may have an area ratio of 5% or more with respect to the whole surface area. The porous article may include, but is not limited to, an abrasive pad used for abrading a semiconductor wafer or glass for display devices, a carbon electrode manufactured by using a binder and a foaming agent, a polymer sheet or film used for improving an absorbent property or wrinkle resistance, a surface of porous ceramic or metal, or the like.

The exemplary above-described method may include forming a hot melt adhesive layer on an adhered surface on which pores are formed (hereinafter, referred to as "porous surface"), and forming a pressure sensitive adhesive layer on the hot melt adhesive layer. In this method, the adhered surface may be a surface of the porous article. In an example, a ratio of a pore area, i.e., an area where the pores are formed, on the adhered surface may be 5% or more with respect to the whole adhered surface area.

The hot melt adhesive layer may be formed by using a hot melt adhesive agent. In the present specification, the term "hot melt adhesive agent" may mean an adhesive agent which can be applied to an adhesion process in a fluid state by being heated unless otherwise specified. Typically, such an adhesive agent is in a solid state before being applied to an adhesion process and if it is cooled after being applied to the adhesion process in the fluid state, it can be solidified in a short time, thereby forming a hot melt adhesive layer. Typically, such a hot melt adhesive agent may be in the form of pellet, film, sheet, or powder before being applied to an adhesion process.

If a hot melt adhesive layer is formed first on a porous surface, the hot melt adhesive layer may fill pores of the porous surface. Further, due to a high elastic force of the formed hot melt adhesive layer, an interface between the porous surface and the hot melt adhesive layer may exhibit an excellent resistance to a shear strength. Furthermore, when the hot melt adhesive layer is attached to the porous surface, support bodies to which the hot melt adhesive layer can be attached are not present at pore sites on the porous surface and the hot melt adhesive layer can be firmly attached to a subsequently formed pressure sensitive adhesive layer in a sporadic manner. Thus, if the porous pressure sensitive adhesive article is attached to other adherents such as a polymer film, a metal, or the like, when a peeling strength is applied, the pressure sensitive adhesive layer and the hot melt adhesive layer firmly attached to each other in a sporadic manner may form fibrils and exhibit a high resistance to a peeling direction. Therefore, the porous pressure sensitive adhesive article has a multilayered structure of the hot melt adhesive layer and the pressure sensitive adhesive layer and can be firmly attached to various kinds of adherents.

A kind of a hot melt adhesive agent forming the hot melt adhesive layer is not particularly limited, and hot melt adhesive agents publicly known in the art may be used. The adhesive agent may include, for example, a urethane hot melt adhesive agent, a polyamide hot melt adhesive agent, a polyester hot melt adhesive agent, a polyolefin hot melt adhesive agent such as polyethylene or polyisobutylene, a polycaprolactame hot melt adhesive agent, a silicon hot melt adhesive agent, or the like.

A method for forming the hot melt adhesive layer on the porous surface is not particularly limited, and there may be used a method appropriate for a hot melt adhesive agent used. In an example, the hot melt adhesive layer may be formed by forming a hot melt adhesive layer on the porous surface and maintaining the hot melt adhesive layer at a temperature of 60° C. to 100° C. for about 30 minutes to about 300 minutes. However, a temperature and/or a time for maintaining the hot melt adhesive layer may be changed depending on a kind of a hot melt adhesive agent used.

A thickness of the hot melt adhesive layer may be adjusted to be in a range of, for example, 5 μm to 40 μm, 10 μm to 40 μm, 10 μm to 35 μm, 10 μm to 30 μm, 10 μm to 25 μm, or 10 μm to 20 μm. The thickness may be changed depending on specific conditions such as a ratio of the pores on the porous surface or a size of the pores.

After the hot melt adhesive layer is formed, a pressure sensitive adhesive layer may be formed. The pressure sensitive adhesive layer may be formed by using a pressure sensitive adhesive agent containing an acryl polymer as an pressure sensitive adhesive resin.

In an example, the acryl polymer may be a polymer containing a carboxyl group. The acryl polymer containing a carboxyl group can efficiently induce a sequential build-up of an adhesive strength and sporadically firm attachment between the hot melt adhesive layer and the pressure sensitive adhesive layer, thus exhibiting a strong resistance to a peeling strength through formation of fibrils when the porous pressure sensitive adhesive article is attached to an adhered surface.

For example, the acryl polymer may include a polymer containing a (meta)acrylic acid ester monomer in an amount of 75 parts by weight to 99 parts by weight and a carboxyl group-containing copolymeric monomer in an amount of 1 part by weight to 15 parts by weight as polymerization units. For example, the acryl polymer may contain the (meta) acrylic acid ester monomer in an amount of 85 parts by weight to 99 parts by weight and the carboxyl group-containing copolymeric monomer in an amount of 2 parts by weight to 10 parts by weight as polymerization units. In the present specification, the unit "parts by weight" may mean a weight ratio between components unless otherwise specified.

For example, the (meta)acrylic acid ester monomer may include, but is not limited to, methyl (meta)acrylate, ethyl (meta)acrylate, n-propyl (meta)acrylate, isopropyl (meta) acrylate, n-butyl (meta)acrylate, t-butyl (meta)acrylate, sec-butyl (meta)acrylate, pentyl (meta)acrylate, 2-ethylhexyl (meta)acrylate, 2-ethylbutyl (meta)acrylate, n-octyl (meta) acrylate, isooctyl (meta)acrylate, isononyl (meta)acrylate, isobornyl (meta)acrylate, alkyl (meta)acrylate containing an alkyl group having 1 to 14 carbon atoms such as lauryl (meta)acrylate or tetradecyl (meta)acrylate, and (meta)acrylate containing an aromatic residue such as benzyl acrylate or phenoxy acrylate.

For example, the carboxyl group-containing copolymeric monomer may include any kind of a compound as long as it has a carboxyl group and a copolymeric part and can form an acryl polymer by being copolymerized with a monomer such as a (meta)acrylate ester monomer or the like and give the carboxyl group to the formed acryl polymer. Such a monomer may include, but is not limited to, an acrylic acid, a methacrylic acid, a 2-(meta)acryloyoxy acetic acid, a 3-(meta)acryloyoxy propylic acid, a (meta)acryloyoxy butylic acid, an acrylic acid dimer, an itaconic acid, a maleic acid, or a maleic acid anhydride.

The acryl polymer may contain other copolymeric monomers as necessary. The other copolymeric monomers may include, but are not limited to, hydroxyl group-containing monomers such as 2-hydroxyethyl (meta)acrylate, 2-hydroxypropyl (meta)acrylate, 4-hydroxybutyl (meta)acrylate, 6-hydroxyhexyl (meta)acrylate, 8-hydroxyoctyl (meta)acrylate, 2-hydroxyethyleneglycol (meta)acrylate, or 2-hydroxypropyleneglycol (meta)acrylate; nitrogen-containing monomers such as (meta)acrylamide, N-butoxy methyl (meta) acrylamide, N-methyl (meta)acrylamide, (meta) acrylonitrile, N-vinyl pyrrolidone, or N-vinyl caprolactame; styrene-based monomers such as styrene or methyl styrene; glycidyl(meta)acrylate; and vinyl ester of a carboxylic acid such as caprolactone or vinyl acetate.

The acryl polymer may be prepared by a polymerization process, such as solution polymerization, photopolymerization, mass-polymerization, suspension polymerization, or emulsion polymerization, of a mixture of the above-described monomers.

The acryl polymer may have a weight average molecular weight (Mw) of 300,000 to 2,500,000, 400,000 to 2,000,000, 400,000 to 1,500,000, 400,000 to 1,000,000, 800,000 to 1,300,000, 600,000 to 1,200,000, or 700,000 to 1,400,000. In the present specification, the weight average molecular weight may mean a conversion value with respect to standard polystyrene measured by using a GPC (Gel Permeation Chromatograph), and a molecular weight may mean the weight average molecular weight unless otherwise specified. If a molecular weight of the acryl polymer is too low, cohesiveness of the pressure sensitive adhesive layer may be decreased, and if a molecular weight of the acryl polymer is too high, a pressure sensitive adhesive property may be decreased. Therefore, a molecular weight can be selected appropriately in consideration of this matter.

Within the pressure sensitive adhesive layer, the acryl polymer may be in a cross-linked state by a multifunctional cross-linking agent. By cross-linking the acryl polymer, cohesiveness of the pressure sensitive adhesive layer can be improved.

The multifunctional cross-linking agent may employ cross-linking agents publicly known in the art without particular limitation. For example, the cross-linking agent may include an isocyanate cross-linking agent, an epoxy cross-linking agent, an aziridine cross-linking agent, or a metal chelate cross-linking agent.

The isocyanate cross-linking agent may include a multifunctional isocyanate compound such as tolylene diisocyanate, xylene diisocyanate, diphenylmethane diisocyanate, hexamethylene diisocyanate, isoboron diisocyanate, tetramethylxylene diisocyanate, or naphthalene diisocyanate or a compound obtained by reacting one or more selected from the above-described isocyanate compounds with polyol such as trimethylol propane. Further, the epoxy cross-linking agent may include ethyleneglycol diglycidylether, triglycidylether, trimethylolpropane triglycidylether, N,N,N',N'-tetraglycidyl ethylenediamine, or glycerin diglycidylether. The aziridine cross-linking agent may include N,N'-toluene-2,4-bis(1-aziridinecarboxamide), N,N'-diphenylmethane-4, 4'-bis(1-aziridinecarboxamide), triethylene melamine, bisisoprothaloyl-1-(2-methylaziridine), or tri-1-aziridinylphosphineoxide. Furthermore, the metal chelate cross-linking agent may include a compound in which a multivalent metal such as aluminum, iron, zinc, tin, titanium, antimony, magnesium, or vanadium is coordinated with a compound such as acetyl acetone or acetoacetic acid ethyl, but the present application is not limited thereto.

Within the pressure sensitive adhesive layer, a content of the multifunctional cross-linking agent is not particularly limited. For example, a content of the multifunctional cross-linking agent may be adjusted in a range in which a gel fraction to be described below can be obtained. If a content of the multifunctional cross-linking agent is too low, sufficient cohesiveness of the pressure sensitive adhesive layer cannot be obtained, and if a content of the multifunctional cross-linking agent is too high, a pressure sensitive adhesive property may be decreased or attachment to the hot melt adhesive layer may not be carried out efficiently. Therefore, a content range may be selected appropriately in consideration of this matter.

The pressure sensitive adhesive layer may further contain various additives publicly known in the art in addition to the above-described components as necessary. For example, the pressure sensitive adhesive layer may further contain a tackifier in consideration of improvement of an adhesive strength with respect to the hot melt adhesive layer or fibril formation efficiency. For example, the tackifier may include, but is not limited to, a rosin ester-based tackifier or a styrene-based tackifier. A kind of a tackifier can be selected and used appropriately as necessary. A content of the tackifier is not particularly limited and can be adjusted in consideration of an adhesive strength with respect to the hot melt adhesive layer or fibril formation efficiency. In an example, the tackifier may be used in an amount of 1 part by weight to 25 parts by weight with respect to 100 parts by weight of the acryl polymer.

In the pressure sensitive adhesive agent forming the pressure sensitive adhesive layer, a gel fraction calculated by General Formula 1 below may be 85% or less, 80% or less, 75% or less, 70% or less, 65% or less, 60% or less, 55% or less, 50% or less, 45% or less, 40% or less, 35% or less, or 30% or less.

$$\text{Gel fraction} = B/A \times 100 \qquad \text{[General Formula 1]}$$

In General Formula 1, A represents a weight of the pressure sensitive adhesive agent, B represents a dry weight of insolubles after the pressure sensitive adhesive agent having the weight A is deposited in ethyl acetate at room temperature for 72 hours.

The gel fraction may mean a gel fraction before the pressure sensitive adhesive agent is applied on the hot melt adhesive layer.

The dry weight may mean a weight measured after ethyl acetate is removed, by a dry process, from a part which is not dissolved, i.e., insolubles of the pressure sensitive adhesive agent, when the pressure sensitive adhesive agent having the weight A is deposited in ethyl acetate at room temperature for 72 hours. A condition of the dry process for removing the ethyl acetate is not particularly limited and can be adjusted appropriately such that the ethyl acetate contained in the insolubles can be substantially completely removed.

Further, the term "room temperature" may mean a temperature in a natural state without heating or cooling, and may fall within a range of, for example, 15° C. to 30° C., 20° C. to 30° C., about 25° C. to about 23° C.

If a gel fraction of the pressure sensitive adhesive agent is too high, an pressure sensitive adhesive property may be decreased or attachment to the hot melt adhesive layer may not be carried out efficiently. Therefore, a gel fraction may be selected appropriately in consideration of this matter.

A lower limit of the gel fraction is not particularly limited and may be, for example, 2% or more, 3% or more, 5% or more, 10% or more, or 15% or more. If a gel fraction of the pressure sensitive adhesive agent is too low, durability of the pressure sensitive adhesive agent may be deteriorated in conditions of high temperature or high humidity.

The pressure sensitive adhesive agent may further contain an initiator such as a thermal initiator or a photo initiator; an epoxy resin; a hardener; a UV stabilizer; an antioxidant; a colorant; a reinforcing agent; filler; an antifoamer; a surfactant; a photopolymeric compound such as a multifunctional acrylate; or an additive such as a plasticizer in a range which does not affect the effect of the present application.

A method for forming the pressure sensitive adhesive layer on the hot melt adhesive layer is not particularly limited. For example, a coating solution prepared by mixing the acryl polymers or the cross-linking agents may be coated and aged on an adequate processing substrate so as to form an pressure sensitive adhesive agent and the pressure sensitive adhesive agent may be laminated on a hot melt adhesive layer so as to form another pressure sensitive adhesive layer.

The pressure sensitive adhesive layer may be formed so as to have a thickness in a range of, for example, 10 μm to 100 μm, 10 μm to 90 μm, 10 μm to 80 μm, 10 μm to 70 μm, 10 μm to 60 μm, 20 μm to 60 μm, 25 μm to 45 μm, 35 μm to 55 μm, or 30 μm to 40 μm, which may be changed depending on a purpose.

The present application also relates to a porous pressure sensitive adhesive article. An example of a porous pressure sensitive adhesive article may include an adherent including a porous surface, for example, the porous article, a hot melt adhesive layer formed on a surface of the adherent, and a pressure sensitive adhesive layer formed on the hot melt adhesive layer. FIG. 1 is a schematic diagram illustrating an article 10 in which a hot melt adhesive layer 30 and a pressure sensitive adhesive layer 40 are formed in sequence on an adherent 20 having pores 21.

In an example, the porous pressure sensitive adhesive article may be an article manufactured by the method already described. Therefore, details of the example porous pressure sensitive adhesive article may be the same as described already.

For example, the hot melt adhesive layer of the porous pressure sensitive adhesive article may contain, for example, a urethane hot melt adhesive agent, a polyamide hot melt adhesive agent, a polyester hot melt adhesive agent, a polyolefin hot melt adhesive agent such as polyethylene or polyisobutylene, a polycaprolactame hot melt adhesive agent, a silicon hot melt adhesive agent, or the like. Further, a thickness of the hot melt adhesive layer of the porous pressure sensitive adhesive article may be in a range of 5 μm to 40 μm.

Furthermore, the pressure sensitive adhesive layer of the porous pressure sensitive adhesive article may contain an acryl polymer containing, for example, the carboxyl group. The polymer may contain a (meta)acrylic acid ester monomer in an amount of 75 parts by weight to 99 parts by weight and a carboxyl group-containing copolymeric monomer in an amount of 1 part by weight to 15 parts by weight as polymerization units. The polymer may have a molecular weight of 300,000 to 2,500,000. For example, the polymer may be in a cross-linked state by a multifunctional cross-linking agent. For example, the pressure sensitive adhesive layer may have the gel fraction of 85% or less, 80% or less, 75% or less, 70% or less, 65% or less, 60% or less, 55% or less, 50% or less, 45% or less, 40% or less, 35% or less, or 30% or less.

Further, as described above, the pressure sensitive adhesive layer may contain a tackifier such as a rosin ester-based tackifier or a styrene-based tackifier at an adequate ratio.

The pressure sensitive adhesive layer may have a thickness of, for example, about 10 μm to about 100 μm.

In an example, an interface between the hot melt adhesive layer and the pressure sensitive adhesive layer of the porous pressure sensitive adhesive article may include fibrils formed by sporadically firm attachment between the hot melt adhesive layer and the pressure sensitive adhesive layer. With this configuration, the porous pressure sensitive adhesive article includes the pressure sensitive adhesive layer formed on the porous article and also exhibits high shear resistance and peeling resistance. FIG. 2 is a schematic diagram illustrating an article 10 in which a hot melt adhesive layer 30 and an pressure sensitive adhesive layer 40 are formed in sequence on an adherent 20 having pores 21 and fibrils 50 are formed by sporadically firm attachment between the hot melt adhesive layer 30 and the pressure sensitive adhesive layer 40.

The present application also discloses a case where the adherent of the porous pressure sensitive adhesive article is an abrasive pad. That is, the present application relates to an abrasive pad comprising a hot melt adhesive layer and a pressure sensitive adhesive layer formed in sequence on its surface.

Details of the hot melt adhesive layer and the pressure sensitive adhesive layer of the abrasive pad may be the same as described regarding the preparation method for a porous pressure sensitive adhesive article or the porous pressure sensitive adhesive article.

Further, the abrasive pad may be an abrasive pad used for abrading, for example, a semiconductor wafer or glass for display devices. A kind of the abrasive pad is not particularly limited, and abrasive pads made of all kinds of materials publicly known in the art may be used.

For example, in the abrasive pad structure, the pressure sensitive adhesive layer may be an pressure sensitive adhesive layer for fixing the abrasive pad to a surface plate.

Effects of the Invention

According to an example method of the present application, as a porous pressure sensitive adhesive article including a pressure sensitive adhesive layer formed on a porous article, an article having excellent resistance to an external shear strength and peeling resistance can be provided. Further, according to the above method, the porous article can be attached firmly to a large-area adherent. In an example, the porous article may be an abrasive pad.

BEST MODE

Figure 1:
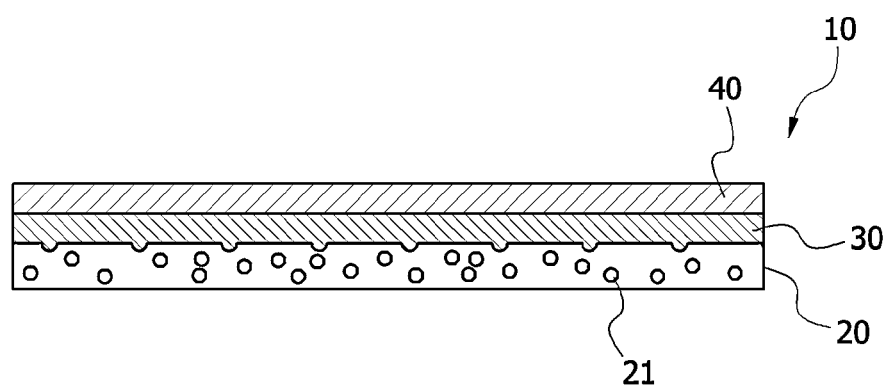
FIGS. 1 and 2 are cross-sectional views illustrating an example of a porous pressure sensitive adhesive article.
Figure 2:
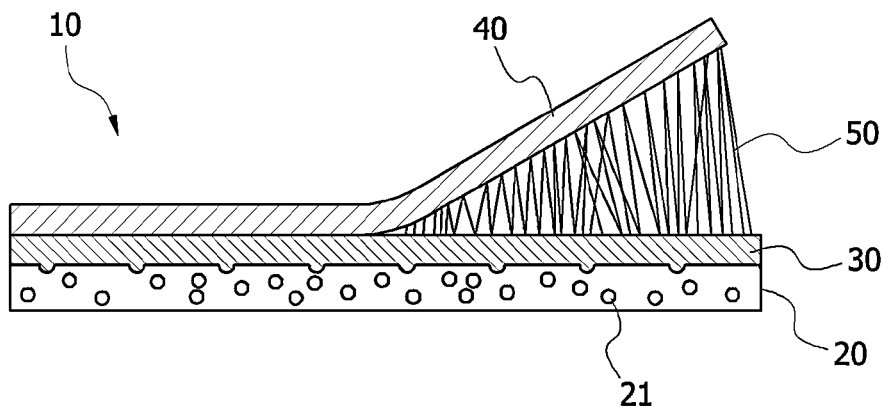

Hereinafter, the above-described method will be explained in detail with reference to Examples and Comparative Examples, but the scope of the above method is not limited to the Examples provided below.

Properties of Examples and Comparative Examples were evaluated by the following method.

1. Measurement of Molecular Weight

A molecular weight of an acryl polymer was measured by using a GPC under the following conditions. Measurement results were converted to prepare a calibration curve by using standard polystyrenes of Agilent system.

<Weight Average Molecular Weight Measurement Conditions>

Measurement apparatus: Agilent GPC (Agilent 1200 series, U.S.A.)
Column: Two-connected PL Mixed B
Column temperature: 40° C.
Eluent: Tetrahydrofuran
Flow rate: 1.0 mL/min
Concentration: ~2 mg/mL (100 μL injection)

2. Measurement of Gel Fraction

About 0.3 g of a pressure sensitive adhesive agent prepared in an Example or Comparative Example was collected and put into a 200 mesh stainless steel sieve. Then, the pressure sensitive adhesive agent was deposited in ethyl acetate and kept in a darkroom at room temperature for 3 days. Thereafter, the adhesive agent (insolubles) which was not dissolved in the ethyl acetate was collected and dried in an oven at 70° C. for 4 hours. Then, a weight (a dry weight in units of g) thereof was measured and substituted into General Formula 1 below so as to measure a gel fraction.

$$\text{Gel fraction (\%)} = (\text{Measured dry weight})/0.3 \times 100 \qquad \text{[General Formula 1]}$$

3. Measurement of Peeling Strength

A peeling strength was evaluated after a porous pressure sensitive adhesive article prepared in an Example or Comparative Example was maintained at room temperature for 3 days. The peeling strength was measured by peeling an outermost PET film of the porous pressure sensitive adhesive article of an Example or Comparative Example at a peeling rate of 5 mm/sec at a peeling angle of 180 degrees by using a tensile tester at room temperature.

4. Measurement of Shear Resistance Strength

After a porous pressure sensitive adhesive article prepared in an Example or Comparative Example was cut out into a circle having a diameter of about 20 cm, an abrasive pad of the porous pressure sensitive adhesive article was rotated at 200 rpm for 3 days while being in contact with glass. It was observed whether the outermost PET film of the porous pressure sensitive adhesive article separated from the pad or whether a gap formed therebetween, and evaluation thereof was conducted based on the following criteria.

<Shear Resistance Strength Evaluation Criteria>
○: A case where peeling of the abrasive pad from the PET film or a gap therebetween were not observed
X: A case where peeling of the abrasive pad from the PET film or a gap therebetween were observed Preparation Example 1

Preparation of Acryl Pressure Sensitive Adhesive Agent (A)

2-ethylhexyl acrylate in an amount of 80 parts by weight, butyl acrylate in an amount of 17 parts by weight, and an acrylic acid in an amount of 3 parts by weight were put into a reactor in which a nitrogen gas was refluxed and a cooling device was provided so as to easily control a temperature, and ethyl acetate (EAc) was added thereto as a solvent. Then, the reactor was purged with the nitrogen gas for 20 minutes in order to remove oxygen and a temperature was maintained at 60° C. While a mixture was uniformalized, azobisisobutyronitrile (AIBN) diluted in ethyl acetate at an adequate concentration was added thereto as a reaction initiator and reacted for 8 hours, thereby preparing an acryl polymer (A) having a molecular weight of 600,000. A tetrafunctional epoxy-based cross-linking agent (Tetrad X, Mitsubishi Gas Chemical Company) was input in an amount of 1.0 part by weight with respect to 100 parts by weight of the prepared polymer (A) so as to prepare a pressure sensitive adhesive composition (A). The prepared pressure sensitive adhesive composition (A) was coated on one side of a PET (poly(ethylene terephthalate)) film having a thickness of about 100 μm so as to have a thickness of about 50 μm after a dry process and aged under adequate conditions, thereby preparing an acryl pressure sensitive adhesive agent (A). The prepared pressure sensitive adhesive agent (A) had a gel fraction of about 90%.

Preparation Examples 2 to 6

Preparation of Acryl Pressure Sensitive Adhesive Agents (A) to (F)

Acryl pressure sensitive adhesive agents were prepared in the same manner as Preparation Example 1 except that the composition of monomers was changed as shown in Table 1 below during a preparation process of an acryl polymer, and reaction conditions or ratios of cross-linking agents were adjusted so as to change molecular weights of polymers and gel fractions of pressure sensitive adhesive agents as shown in Table 1.

However, in Preparation Example 3, a tolylene diisocyanate addition of trimethylolpropane was used as an isocyanate cross-linking agent instead of the epoxy-based cross-linking agent to prepare an pressure sensitive adhesive agent (C) having a gel content as required.

Further, in Preparation Examples 5 and 6, tackifiers listed in Table 1 were added to pressure sensitive adhesive compositions and then stirred at about 200 rpm for about 20 minutes. The resultant pressure sensitive adhesive compositions were used to prepare pressure sensitive adhesive agents (E) and (F).

TABLE 1

| | | Preparation Example | | | | | |
|---|---|---|---|---|---|---|---|
| | | 1 (A) | 2 (B) | 3 (C) | 4 (D) | 5 (E) | 6 (F) |
| Composition of monomers (Content unit: Parts by weight) | EHA | 80 | 80 | 80 | — | 80 | 80 |
| | BA | 17 | 17 | 13 | 97 | 17 | 17 |
| | AA | 3 | 3 | — | 3 | 3 | 3 |
| | HEA | — | — | 7 | — | — | — |
| Molecular weight of polymer (unit: ten thousand) | | 60 | 60 | 60 | 75 | 60 | 60 |
| Rosin ester-based tackifier | | — | — | — | — | 25 | — |
| Styrene-based tackifier | | — | — | — | — | — | 3 |
| Gel fraction of pressure sensitive adhesive agent (unit: %) | | 90 | 15 | 15 | 22 | 15 | 15 |

EHA: 2-ethylhexyl acrylate
BA: butyl acrylate
AA: acrylic acid
HEA: 2-hydroxyethyl acrylate

Example 1

Figure 3:
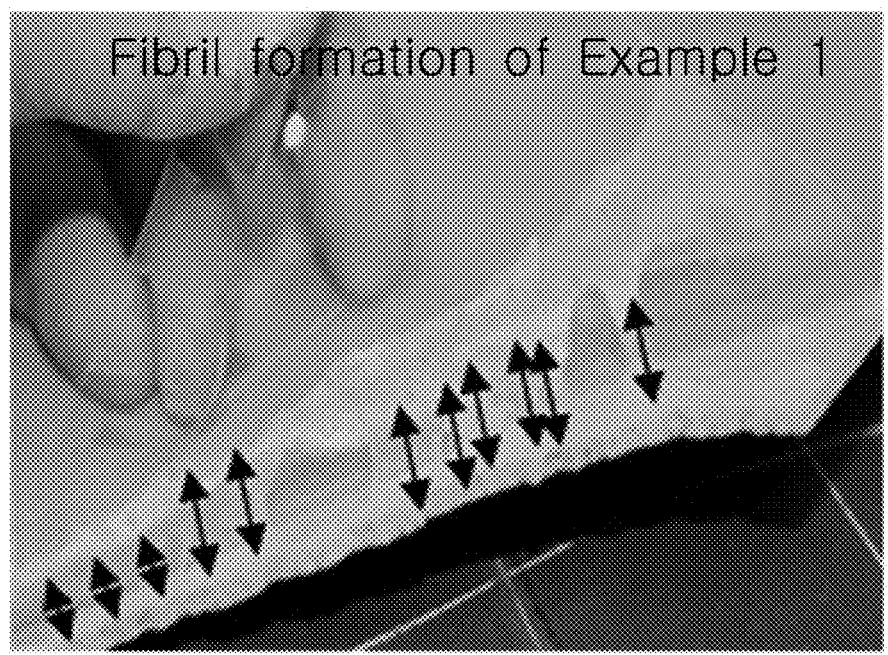
FIG. 3 is a photograph of fibrils formed on an interface between a hot melt adhesive layer and a pressure sensitive adhesive layer of a porous pressure sensitive adhesive article prepared in an Example.

A urethane-based hot melt adhesive agent was coated to a thickness of about 20 μm on a release-treated surface of a release-treated PET film. The coated adhesive agent was laminated on a urethane-based abrasive pad typically used for abrading glass for display devices. Then, the abrasive pad on which the adhesive agent was laminated was kept in an oven at 80° C. for about 2 hours so as to form a hot melt adhesive layer. Thereafter, the release-treated PET film was peeled from the formed hot melt adhesive layer and an acryl pressure sensitive adhesive agent (B) prepared in Preparation Example 2 was coated to a thickness of 50 μm on one side of the peeling surface as an pressure sensitive adhesive surface of the PET film, and then the pressure sensitive adhesive surface of the PET film was laminated by a laminator, thereby preparing an abrasive pad as a porous pressure sensitive adhesive article attached to the PET film. FIG. 3 is a photograph of fibrils formed on an interface between a hot melt adhesive layer and a pressure sensitive adhesive layer of the porous pressure sensitive adhesive article prepared in Example 1 when the PET film was peeled from the porous pressure sensitive adhesive article.

Example 2

A porous pressure sensitive adhesive article was prepared in the same manner as Example 1 except that a pressure sensitive adhesive agent (D) was used instead of the pressure sensitive adhesive agent (B).

Example 3

A porous pressure sensitive adhesive article was prepared in the same manner as Example 1 except that a polyamide-based hot melt adhesive agent was used as the hot melt adhesive agent.

Example 4

A porous pressure sensitive adhesive article was prepared in the same manner as Example 1 except that a pressure sensitive adhesive agent (E) was used instead of the pressure sensitive adhesive agent (B).

Example 5

A porous pressure sensitive adhesive article was prepared in the same manner as Example 1 except that a pressure sensitive adhesive agent (F) was used instead of the pressure sensitive adhesive agent (B).

Example 6

A porous pressure sensitive adhesive article was prepared in the same manner as Example 1 except that a pressure sensitive adhesive agent (A) was used instead of the pressure sensitive adhesive agent (B).

Example 7

A porous pressure sensitive adhesive article was prepared in the same manner as Example 1 except that a pressure sensitive adhesive agent (C) was used instead of the pressure sensitive adhesive agent (B).

Comparative Example 1

A porous pressure sensitive adhesive article attached to a PET film was prepared by laminating a pressure sensitive adhesive (B) surface of the PET film whose one side was coated with the pressure sensitive adhesive agent (B) prepared in Preparation Example 1 to a thickness of 50 μm without forming a hot melt adhesive layer on one side of the same abrasive pad as used in Example 1.

Comparative Example 2

The same hot melt adhesive agent as used in Example 1 was coated on one side of a release-treated PET film in the same manner as Example 1, and the hot melt adhesive agent coated on the release-treated PET film was laminated on the same abrasive pad as used in Example 1 by a laminator. Then, the release-treated PET film was peeled, and only a PET film was attached to the peeling surface without a pressure sensitive adhesive layer and maintained in an oven at 80° C. for 2 hours, thereby preparing a porous pressure sensitive adhesive article with the PET film attached.

Properties of the Examples and Comparative Examples were compared as shown in Table 2 below.

TABLE 2

| | Example | | | | | | | Comparative Example | |
|---|---|---|---|---|---|---|---|---|---|
| | 1 | 2 | 3 | 4 | 5 | 6 | 7 | 1 | 2 |
| Peeling strength (unit: g/inch) | 3500 | 3400 | 3200 | 4500 | 4700 | 1800 | 2100 | Failed | Failed |
| Shear resistance strength | ○ | ○ | ○ | ○ | ○ | X | X | — | — |
| Fibril | Observed | Observed | Observed | Observed | Observed | Not observed | Not observed | — | — |

Failed: An adhesive strength between an abrasive pad and a PET film was too small to be measured.

DESCRIPTION OF MAIN REFERENCE NUMERALS OF DRAWINGS

10: Porous pressure sensitive adhesive article
20: Porous article
21: Pores
30: Hot melt adhesive layer
40: Pressure sensitive adhesive layer
50: Fibril

The invention claimed is:

1. A preparation method for a porous pressure sensitive adhesive article, comprising:
    forming a hot melt adhesive layer on an adhered surface on which pores are formed; and
    forming a pressure sensitive adhesive layer on the hot melt adhesive layer,
    wherein the pressure sensitive adhesive layer comprises an acryl polymer having a carboxyl group,
    wherein the acryl polymer comprises a (meth)acrylic acid ester monomer in an amount of 75 parts by weight to 99 parts by weight, and a carboxyl group-containing copolymeric monomer in an amount of 1 part by weight to 15 parts by weight as polymerization units,
    wherein the pressure sensitive adhesive layer has a gel fraction of 30% or less, and
    wherein the adhered surface is a surface of an abrasive pad.

2. The preparation method of claim 1, wherein a ratio of an area where the pores are formed on the adhered surface is 5% or more with respect to the whole adhered surface area.

3. The preparation method of claim 1, wherein the hot melt adhesive layer is formed by using a urethane hot melt adhesive agent, a polyamide hot melt adhesive agent, a polyester hot melt adhesive agent, a polyolefin hot melt adhesive agent, a polycaprolactame hot melt adhesive agent, or a silicon hot melt adhesive agent.

4. The preparation method of claim 1, wherein the hot melt adhesive layer is formed by forming a hot melt adhesive agent on the adhered surface and maintaining the hot melt adhesive agent at 60° C. to 100° C. for 30 minutes to 300 minutes.

5. The preparation method of claim 1, wherein the acryl polymer has a weight average molecular weight of 300,000 to 2,500,000.

6. The preparation method of claim 1, wherein the acryl polymer is in a cross-linked state by a multifunctional cross-linking agent.

7. The preparation method of claim 1, wherein the pressure sensitive adhesive layer further comprises a tackifier.

8. The preparation method of claim 7, wherein the tackifier includes a rosin ester-based tackifier or a styrene-based tackifier.

9. The preparation method of claim 7, wherein the pressure sensitive adhesive layer comprises the tackifier in an amount of 1 part by weight to 25 parts by weight with respect to 100 parts by weight of the acryl polymer.

* * * * *